United States Patent [19]

Boice

[11] 4,317,585

[45] Mar. 2, 1982

[54] TORQUED DRILL PIPE IDENTIFICATION

[75] Inventor: Elvin G. Boice, Richmond, Va.

[73] Assignee: Reynolds Metals Company, Richmond, Va.

[21] Appl. No.: 154,615

[22] Filed: May 30, 1980

[51] Int. Cl.³ .............................................. F16L 15/00
[52] U.S. Cl. ..................................... 285/93; 116/212; 116/DIG. 21; 285/333
[58] Field of Search ........................ 285/93, 333, 334; 403/27; 116/212, DIG. 21, DIG. 34; 73/847

[56] References Cited

U.S. PATENT DOCUMENTS

| | | | |
|---|---|---|---|
| 233,712 | 10/1880 | Thurston | 73/847 X |
| 1,606,941 | 11/1926 | Holman | 285/93 X |
| 2,029,798 | 2/1936 | Schellin | 285/93 |
| 2,454,850 | 11/1948 | Van Winkle et al. | 73/847 X |
| 2,772,899 | 12/1956 | Evans | 285/333 |
| 3,468,563 | 9/1969 | Duret | 285/93 |
| 4,127,927 | 12/1978 | Hauk et al. | 285/93 X |
| 4,154,466 | 5/1979 | Simmons | 285/93 X |

*Primary Examiner*—Thomas F. Callaghan
*Attorney, Agent, or Firm*—Lyne, Girard & McDonald

[57] ABSTRACT

Suitable marks on protected places at opposite ends of a drill pipe make it possible to inspect the pipe after it has been used in a drill string to determine whether it has been subjected to excessive torque in the course of its previous use, so that it should not be used again in a new string. This reduces the risk of any pipe breaking in the new string, which would cause great trouble and expense.

4 Claims, 2 Drawing Figures

TORQUED DRILL PIPE IDENTIFICATION

BACKGROUND OF THE INVENTION

Drill pipes are conventionally used in a string of such pipes connected together for purposes of drilling oil wells and the like. After such use, the string is removed and the pipes are successively disconnected from the string and laid aside for future reuse. During use a drill pipe may be subjected to excessive torque, with the result that it takes a permanent deformation that can lead to subsequent breaking of the pipe when it is again subjected to heavy strain. Since a pipe breaking while it is part of a string will cause a great deal of trouble and expense, it has long been desirable to find a practicable way of identifying those pipes which have been twisted excessively so that they will not be reused when new strings are assembled.

SUMMARY

In accordance with the present invention, a drill pipe is marked in a protected place at each of its opposite ends, so that the amount of any excessive angular deformation of the pipe can readily be detected.

Other details and advantages of the invention will be apparent as the following description of the embodiment thereof in the accompanying drawing proceeds.

BRIEF DESCRIPTION OF THE DRAWINGS

The accompanying FIGS. 1 and 2 schematically illustrate isometric views of each end of a drill pipe embodying the invention.

DESCRIPTION OF ILLUSTRATED EMBODIMENT

Figure 1:
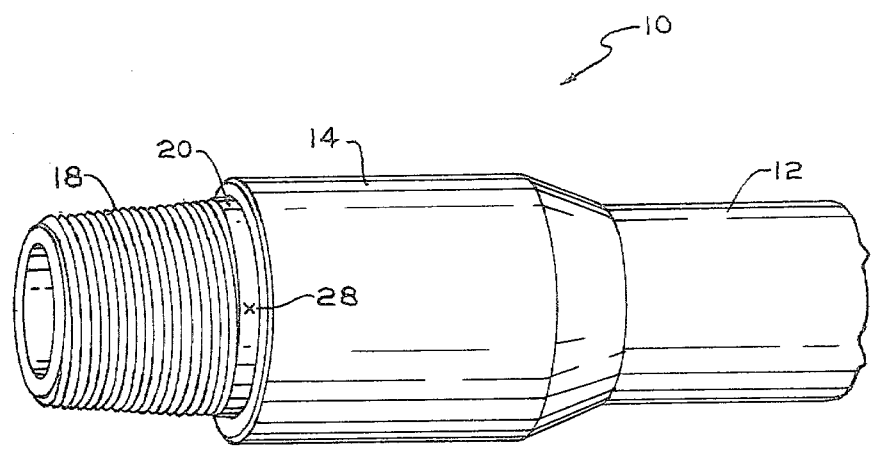

Referring now more particularly to the figures, the illustrated drill pipe 10 has an elongated central section 12 integral with enlarged opposite ends 14 and 16. The pin end 14 carries a projecting threaded portion 18 adapted to be screwed into a tool joint (not shown), and a shoulder 20, known as the pin land, extends between the threaded portion 18 and the rest of the pin end 14. At the other end of the pipe 10 the box end 16 is internally threaded at 22 to receive a threaded connection with a tool joint, and there is an unthreaded box counterbore 24 between the threading 22 and the extreme end of the pipe end 16.

A suitable mark 26 is inscribed or otherwise affixed permanently to the inside of box counterbore 24, and a corresponding mark 28 is similarly placed on the shoulder 20 at the other end of pipe 10. These positions are protected from abrasion and the like while the pipe is in use in a drill string.

Figure 2:
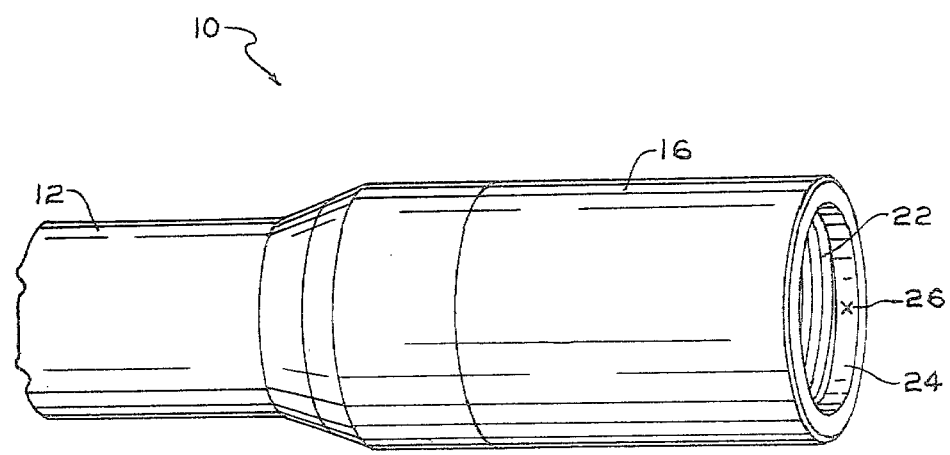

The two marks could be at any arbitrarily selected position relative to each other, such as both on exactly the same side of the pipe 10. However, in the preferred practice of the invention the marks 26 and 28 are oriented 180° apart, so that the pipe 10 can be placed on its side with the mark 26, for example, in its lowermost position, and then it can be determined by inspection whether the mark 28 is in its uppermost position, or as been moved by excessive torque to a displaced position. Thus, as illustrated, FIGS. 1 and 2 illustrate ends 14 and 16 of the drill pipe 10 rotated 180° with respect to one another. A few degrees of displacement would not be serious, but a displacement of as much as ten degrees, for example, would be grounds for rejecting the pipe.

The invention is applicable to drill pipes of steel or aluminum construction.

While the present preferred embodiment of the invention and method of practicing the same has been illustrated and described, it will be understood that the invention may be otherwise embodied in practice within the scope of the following claims.

What is claimed is:

1. In a length of drill pipe, said drill pipe having threads at each end thereof, the improvement comprising a permanent mark at each end of said drill pipe at a protected position thereof, said marks not being directly exposed to abrasion or the like either inside or outside said drill pipe in the assembled position with other similar drill pipes in a drill string, said marks being positioned in predetermined angular relationship to one another so that any permanent deformation of said drill pipe through torque in the course of use of said drill pipe can be determined by inspection of the relative positions of said marks.

2. The drill pipe of claim 1 in which at least one of said marks is positioned at a protected location adjacent to the termination of said threads at one end of said drill pipe.

3. The drill pipe of claim 1 in which each of said marks is positioned at a protected location adjacent to the termination of said threads at one end of said drill pipe.

4. The drill pipe of claim 1 in which said marks are positioned at a protected location 180° from each other.

* * * * *